United States Patent
Nakayama et al.

(10) Patent No.: US 11,181,885 B2
(45) Date of Patent: Nov. 23, 2021

(54) MANUFACTURING DEVICE MONITORING SYSTEM AND MANUFACTURING DEVICE

(71) Applicant: Panasonic Intellectual Property Management Co., Ltd., Osaka (JP)

(72) Inventors: Takuya Nakayama, Fukuoka (JP); Tetsushi Oohori, Tokyo (JP); Kenichiro Ishimoto, Saga (JP); Atsushi Nakazono, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 856 days.

(21) Appl. No.: 15/986,198

(22) Filed: May 22, 2018

(65) Prior Publication Data

US 2018/0348733 A1 Dec. 6, 2018

(30) Foreign Application Priority Data

May 30, 2017 (JP) .............................. JP2017-106113

(51) Int. Cl.
G05B 19/4063 (2006.01)

(52) U.S. Cl.
CPC .................. *G05B 19/4063* (2013.01); *G05B 2219/31455* (2013.01); *G05B 2219/34279* (2013.01)

(58) Field of Classification Search
CPC ...... G05B 19/4063; G05B 2219/31455; G05B 2219/34729; G05B 23/0205; G05B 23/0218
See application file for complete search history.

(56) References Cited

U.S. PATENT DOCUMENTS

| | | | | |
|---|---|---|---|---|
| 5,115,177 A | * | 5/1992 | Tanaka | G05B 19/4063 318/568.1 |
| 2008/0291014 A1 | * | 11/2008 | Chigusa | G07C 5/0808 340/540 |
| 2011/0231701 A1 | * | 9/2011 | Aoki | G06F 11/1433 714/15 |
| 2015/0135524 A1 | | 5/2015 | Yokomae et al. | |

FOREIGN PATENT DOCUMENTS

| | | | |
|---|---|---|---|
| JP | 2015-097224 | 5/2015 | |
| WO | WO-2014169645 A1 * | 10/2014 | ............ H04W 24/04 |

* cited by examiner

*Primary Examiner* — John E Breene
*Assistant Examiner* — Liam R Casey
(74) *Attorney, Agent, or Firm* — Pearne & Gordon LLP

(57) ABSTRACT

A manufacturing device monitoring system includes a plurality of manufacturing devices and a remote monitoring device. The manufacturing device includes a work unit, an equipment notifier, an error detector, and an error notifier. The error notifier determines whether or not an error detected by the error detector may be corrected by an operation from the remote monitoring device, notifies the remote monitoring device of the occurrence of the error in a case where the error can be corrected, and operates the equipment notifier to notify a first notification pattern in a case where the error cannot be corrected.

16 Claims, 5 Drawing Sheets

MANUFACTURING DEVICE MONITORING SYSTEM AND MANUFACTURING DEVICE

BACKGROUND

1. Technical Field

The present disclosure relates to a manufacturing device monitoring system and a manufacturing device in a factory having a plurality of manufacturing devices.

2. Description of the Related Art

In a factory such as a component mounting field where components are mounted on a board, a production system is constituted by a plurality of manufacturing devices such as mounting machines. In such a factory manufacturing site, for a plurality of manufacturing devices operating at the same time, a worker monitors an operation state of a manufacturing device and performs a necessary response action. In the manufacturing site in recent years, as labor saving and automation have progressed with the request for improvement in work efficiency, a production system that is configured to allow remote operations from a remote location without requiring the worker to access the manufacturing device has been introduced (for example, see Japanese Patent Unexamined Publication No. 2015-97224 (PTL 1)).

In the related art shown in PTL 1, in a component mounting system constituted by a plurality of mounting machines, there is described an example in which a mounting machine selected by an operation on an operation screen of a portable operation terminal and the portable operation terminal are connected to each other. Thereby, it is possible to perform various operations on a plurality of mounting machines via an operation panel displayed on a display panel of the operation terminal without accessing the individual mounting machines.

SUMMARY

A manufacturing device monitoring system of the present disclosure includes a plurality of manufacturing devices and a remote monitoring device. The remote monitoring device is connected to a plurality of manufacturing devices via a communication network, and a plurality of manufacturing devices can be remotely operated. Each of the plurality of manufacturing devices includes a work unit, an equipment notifier, an error detector, and an error notifier. The error detector detects an error occurring in the work unit. The error notifier determines whether or not the error detected by the error detector may be corrected by an operation from the remote monitoring device, notifies the remote monitoring device of the occurrence of the error in a case where the error can be corrected, and operates the equipment notifier to notify a first notification pattern in a case where the error cannot be corrected. The manufacturing device of the present disclosure is connected to the remote monitoring device via a communication network, and a remote operation can be performed by the remote monitoring device. The manufacturing device includes a work unit, an equipment notifier, an error detector, and an error notifier. The error detector detects an error occurring in the work unit. The error notifier determines whether or not the error detected by the error detector may be corrected by operation from the remote monitoring device, notifies the remote monitoring device of the occurrence of the error in a case where the error can be corrected, and operates the equipment notifier to notify a first notification pattern in a case where the error cannot be corrected.

DETAILED DESCRIPTION

Operations required for a manufacturing device such as a mounting machine include various such as items that may be executed only after checking the device state of the manufacturing device and in particular, items that may be handled only by remote control without requiring checking of the device state. The mounting machine of the related art may be remotely operated by an operation terminal. However, it is difficult for a worker to determine whether each operation item may be executed by a remote operation.

For this reason, in a case where a notice requesting a response action such as error notification is given to the portable terminal, the worker had to access the mounting machine where the error occurred each time to check the situation and to perform a response action. As a result, it is difficult to reduce the workload of the worker who performs monitoring work in a factory having a plurality of manufacturing devices to achieve labor saving, and effective countermeasures have been desired.

Figure 1:
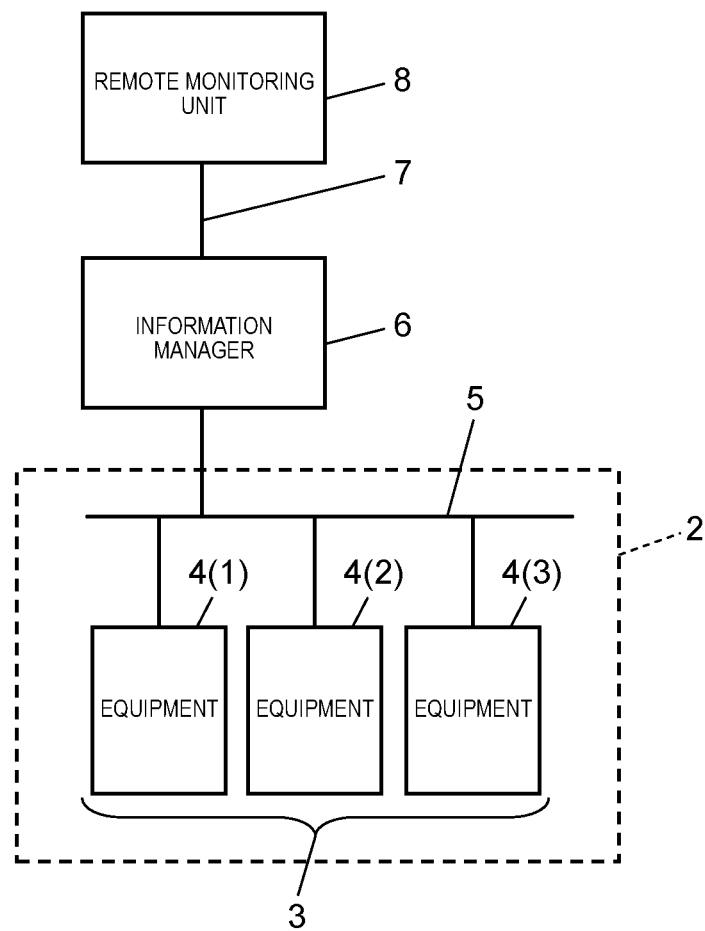
FIG. 1 is a block diagram showing a configuration of a manufacturing device monitoring system according to an embodiment.

Next, the present embodiment will be described with reference to drawings. First, referring to FIG. 1, a configuration of manufacturing device monitoring system 1 will be described. Manufacturing device monitoring system 1 has a function of monitoring the operation state of each manufacturing device in a factory having a plurality of manufacturing devices. In production area 2 where the worker performs work, production line 3 constituted by a plurality of pieces of equipment 4 which is a manufacturing device (in this case, three pieces of equipment 4(1), equipment 4(2), and equipment 4(3)) is arranged. An example of production line 3 includes a component mounting line in which equipment 4 for component mounting is connected. Equipment 4 for component mounting is a component mounting machine for mounting electronic components on a board, a printing machine for printing solder for joining components, and the like.

The plurality of pieces of equipment 4 are connected to each other by communication network 5 such as a LAN (Local Area Network) and connected to information manager 6. Information manager 6 provides various data necessary for operating the plurality of pieces of equipment 4 and has a function of collecting the state and operation information of these pieces of equipment 4. In the case where production line 3 is a component mounting line, mounting data including component information on the components mounted on the board, mounting position information on which components are mounted on the board, and the like are to be provided.

In addition, the data to be provided by information manager 6 contains an error list that summarizes information on errors such as defects and failures that are predicted to occur for each piece of equipment 4. In the present embodiment, the error list contains remote operation target error information (see FIG. 2) which is previously selected and defined as an error that can be handled by a remote operation by remote monitoring unit 8 to be described below.

Further, information manager 6 is connected to remote monitoring unit 8 which is a remote monitoring device in communication network 7 such as a LAN or a public communication line. Remote monitoring unit 8 has a function of monitoring the operation state of each piece of equipment 4 in production area 2 from a remote location and performing a remote operation as necessary in case of occurrence of an error or the like. In this configuration, information manager 6 functions as a relay terminal at the time of remote-monitoring and performing a remote operation by remote monitoring unit 8.

As remote monitoring unit 8, a terminal device having data input/output, an arithmetic processing function, a display function, such as a general-purpose PC (Personal Computer) is used. Remote monitoring unit 8 may be installed in a location different from production area 2 within the same factory premises. Alternatively, remote monitoring unit 8 may be installed at a remote location separated from a factory including remote monitoring unit 8, such as another business office. In a case where remote monitoring unit 8 is located in the same factory premises, remote monitoring unit 8 may be connected to information manager 6 via communication network 7 using a LAN in the factory. In a case where remote monitoring unit 8 is installed in a remote location, remote monitoring unit 8 may be connected to information manager 6 via communication network 7 using a public communication line such as optical communication.

Here, remote monitoring unit 8 is connected to a plurality of production lines 3 arranged in a plurality of production areas 2 and therefore the plurality of production lines 3 can be subjected to remote monitoring and a remote operation. Therefore, manufacturing device monitoring system 1 may include at least one remote monitoring unit 8. That is, manufacturing device monitoring system 1 is configured to include remote monitoring unit 8 as at least one remote monitoring device connected to a plurality of manufacturing devices, equipment 4 via communication network 7 and capable of remotely operating the plurality of pieces of equipment 4.

Figure 2:
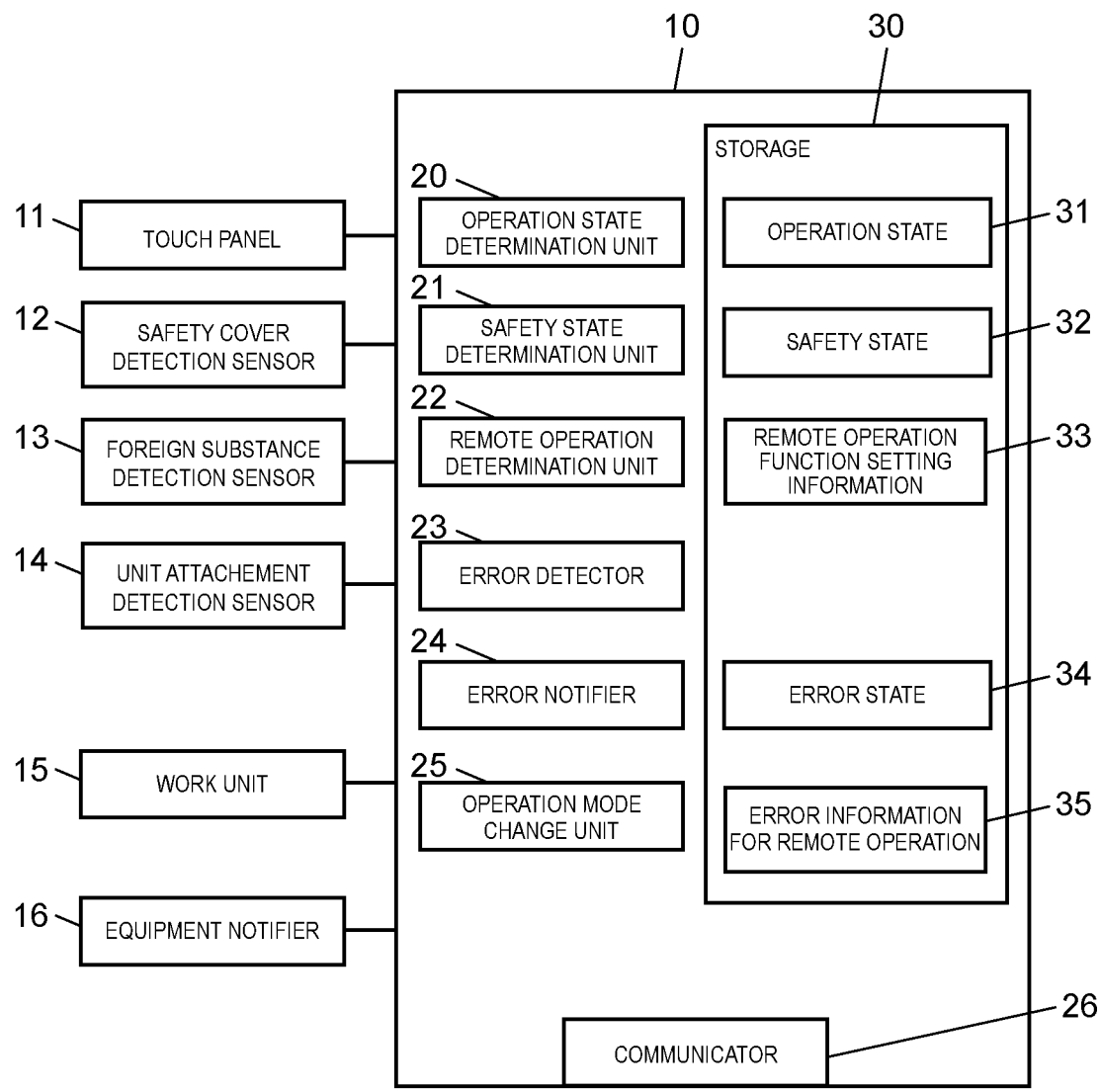
FIG. 2 is a block diagram showing a configuration of a control system of a manufacturing device according to the embodiment.

Next, referring to FIG. 2, a configuration of the control system of equipment 4(1) will be described. FIG. 2 is a block diagram showing a configuration of a control system of the manufacturing device (equipment 4) according to the embodiment. Equipment 4(2) and equipment 4(3) also have the same configuration as equipment 4 (1). Here, among the functions of equipment 4(1), only the components relating to the remote operation functions of monitoring an error occurring in equipment 4(1) by remote monitoring unit 8 and executing an error correction operation for correcting the error by remote monitoring unit 8 are covered.

In FIG. 2, signals and information of touch panel 11, safety cover detection sensor 12, foreign substance detection sensor 13, and unit attachment detection sensor 14 are input to controller 10. Touch panel 11 is an operation input device. When the worker touches the operation screen displayed on touch panel 11, an input for operating equipment 4(1) is performed. Safety cover detection sensor 12 detects the opening and closing state of a safety cover provided at a part where the worker may be at risk if the worker carelessly accesses such as the movable mechanism part of equipment 4(1). Foreign substance detection sensor 13 detects the presence or absence of a foreign substance which is not supposed to be present in equipment 4(1). Unit attachment detection sensor 14 detects whether or not a detachable unit constituting equipment 4(1), for example, a tape feeder or a feeder carriage in a mounting machine, is properly attached.

Work unit 15 and equipment notifier 16 are connected to controller 10. Work unit 15 is an operating mechanism unit that executes an operation in equipment 4(1) and executes a predetermined operation according to a control command from controller 10. Equipment notifier 16 is an alarm device such as a signal tower or a buzzer and performs predetermined notification on a predetermined target such as an error notification in accordance with a notification command from controller 10.

Controller 10 includes operation state determination unit 20, safety state determination unit 21, remote operation determination unit 22, error detector 23, error notifier 24, and operation mode change unit 25 as internal processing functions. Further, controller 10 includes storage 30 and communicator 26. In storage 30, information necessary for the operation of the remote operation function for executing an error correction operation by remote monitoring unit 8 is stored. Communicator 26 is a communication interface and is connected to each piece of equipment 4 and information manager 6 in production area 2 by communication network 5. As a result, various data can be exchanged with remote monitoring unit 8 via information manager 6.

Operation state determination unit 20 determines whether the state of equipment 4(1) is in an operation state or a non-operation state and writes the determination result to "operation state" 31 of storage 30. Specifically, operation state determination unit 20 determines whether or not a preset predetermined time has elapsed from the timing at which the operation of touch panel 11, an operation switch, or the safety cover is last executed. If the predetermined time has elapsed, it is determined that equipment 4(1) is in a non-operation state, and information indicating "not in operation" is written in "operation state" 31. In addition, in a case where the predetermined time has not yet elapsed, it is determined that equipment 4(1) is in an operation state, and information indicating "in operation" is written in "operation state" 31.

Based on detection signals from safety cover detection sensor 12, foreign substance detection sensor 13, and unit attachment detection sensor 14, safety state determination unit 21 determines whether equipment 4(1) is in a safe state, and writes the determination result to "safety state" 32 of storage 30. That is, safety state determination unit 21 first checks that the safety covers are all closed according to the detection result of safety cover detection sensor 12. Next, safety state determination unit 21 checks that there is no foreign substance or the like that interferes with the movable mechanism unit within equipment 4(1) according to the detection result of foreign substance detection sensor 13. Further, safety state determination unit 21 checks that the unit such as the tape feeder and the carriage is properly mounted based on the detection result of unit attachment detection sensor 14.

In a case where all of these conditions are satisfied, safety state determination unit 21 determines that equipment 4(1)

is in a safe state in performing a remote operation and writes information indicating "safe" in "safety state" 32 of storage 30. In addition, in a case where the above conditions are not satisfied, information indicating "danger" is written in "safety state" 32 of storage 30.

Remote operation determination unit 22 refers to "operation state" 31, "safety state" 32, and "remote operation function setting information" 33 stored in storage 30 to determine whether or not equipment 4(1) is in a state in which a remote operation can be performed. Here, "remote operation function setting information" 33 is information indicating whether or not equipment 4(1) is set in a state in which a remote operation function can be performed in manufacturing device monitoring system 1. Specifically, "remote operation function setting information" 33 includes license information indicating that a license for accepting a service through the remote operation function in manufacturing device monitoring system 1 is valid. Further, "remote operation function setting information" 33 includes function setting information indicating whether equipment 4(1) has enabled the remote operation function.

In the determination of the remote operation determination by remote operation determination unit 22, in a case where the operation state in "operation state" 31 is "not in operation", the safety state in "safety state" 32 is "safe", the remote operation function is valid in "remote operation function setting information" 33, and the license is valid, it is determined that the state is "remote operation acceptable". In other cases, it is determined that the state is "remote operation unacceptable". The determination result is output to information manager 6 via communicator 26 and communication network 5 and further transmitted to remote monitoring unit 8 via communication network 7. Remote monitoring unit 8 that has accepted the determination result identifies and displays whether or not equipment 4(1) is capable of accepting a remote operation by letters, colors, or the like.

Error detector 23 detects an unusual event occurring in the equipment as an error in a process in which controller 10 controls work unit 15 to execute a predetermined work operation. This error detection is performed based on signals and information sent from various sensors and measurement units arranged in each part of work unit 15 during automatic operation. In a case where an error is detected, information (error code) indicating the error is written in "error state" 34 of storage 30. In a case where the error is resolved, the written error code is erased.

Among the error items detected by error detector 23, an error item that can be corrected by a remote operation from remote monitoring unit 8 is stored as "error information for remote operation" 35 in storage 30. Here, the error for remote operation means an error item that can be handled without requiring a site work where the worker visits the site of the equipment and checks the site and performs a physical procedure. Specifically, the details of the error can be specified by the screen information displayed on monitor 41 (see FIG. 3) of remote monitoring unit 8. An error item that can be handled only with an operation input from operation unit 42 such as a touch panel corresponds to an error for remote operation. That is, in manufacturing device monitoring system 1 shown in the present embodiment, the plurality of pieces of equipment 4 has "error information for remote operation" 35 which is error information defining an error that can be corrected at least by an operation from remote monitoring unit 8.

By collating the error item detected by error detector 23 and stored in "error state" 34 with "error information for remote operation" 35, it is determined whether or not the detected error is an error that can be set as a target of the remote operation performed via remote monitoring unit 8. The determination result is transmitted from communicator 26 to remote monitoring unit 8 via information manager 6 and communication network 7.

Error notifier 24 performs processing of notifying the worker who is in charge of operation of the equipment or a remote operator who operates remote monitoring unit 8 that an error occurs in equipment 4(1). This error notification is executed according to the case classification described below. When the occurrence of an error is detected by error detector 23, first, it is determined whether or not the error is an error to be remotely operated based on the error code stored in "error state" 34 of storage 30. That is, error notifier 24 determines whether or not the error can be corrected by a remote operation from remote monitoring unit 8 by collating the error detected by error detector 23 with "error information for remote operation" 35.

Here, in a case where the error is an error to be remotely operated that can be corrected by a remote operation from remote monitoring unit 8, according to the state of the remote operation of target equipment 4(1), the error it is handled as follows. That is, in a case where the state of equipment 4(1) is determined as "remote operation unacceptable" by remote operation determination unit 22, the occurrence of the error is notified to the worker at the site of production area 2 by equipment notifier 16. In this case, error notifier 24 operates equipment notifier 16 to notify a first notification pattern.

Here, the first notification pattern is in a noticeable form with a high degree of attention, which is also recognizable to the worker who is at a remote location away from equipment 4(1) in production area 2. For example, the first notification pattern is in a form of a large sound, a long sound, music, or the like. By notifying an error with such the first notification pattern, it is possible to reliably notify the worker at a location away from equipment 4(1) where the error occurred that an error that cannot be corrected by a remote operation has occurred. Thus, when an error occurs, a response delay due to the insufficient notification is prevented, and quick error handling is executed thoroughly.

In addition, in a case where remote operation determination unit 22 determines that the state of equipment 4(1) is "remote operation acceptable", the occurrence of an error is notified from communicator 26 to remote monitoring unit 8 via information manager 6 and communication network 7.

In this way, monitoring and notification unit 43 (FIG. 3) included in remote monitoring unit 8 operates to notify the remote operator in charge of the operation of remote monitoring unit 8 of the occurrence of an error. At the same time, touch panel 11 of equipment 4(1) displays that an error to be remotely operated has occurred.

In this case, it is not absolutely necessary to report an error to operate equipment notifier 16. However, equipment notifier 16 may be operated to allow the worker at the site of production area 2 to recognize that an error to be remotely operated has occurred in equipment 4(1). For example, equipment notifier 16 may operate equipment notifier 16 to notify a second notification pattern of a modest form with low attention (for example, in a form of a small sound or a short sound) than the above-described first notification pattern.

On the other hand, in a case where the error is an error that cannot be corrected by a remote operation from remote monitoring unit 8 and is not an error to be remotely operated, the occurrence of an error is notified to the worker who is at the site of production area 2 by equipment notifier 16 regardless of the remote operation state of equipment 4(1). In this case, notification is performed by operating equipment notifier 16 with the above-described first notification pattern. As a result, similarly to the above case, it is possible to reliably notify the worker at a location away from equipment 4 where the error occurred that an error that cannot be corrected by a remote operation has occurred.

That is, in the error notification described above, error notifier 24 determines whether or not the error detected by error detector 23 can be corrected by the operation from remote monitoring unit 8. In a case where the error cannot be corrected, at least equipment notifier 16 is operated with the first notification pattern, and in a case where the error can be corrected, at least remote monitoring unit 8 is notified of the occurrence of the error. In a case where the error detected by error detector 23 can be corrected by the operation from remote monitoring unit 8, error notifier 24 notifies remote monitoring unit 8 of the occurrence of the error and also operates equipment notifier 16 with the second operation pattern.

In addition, based on the error detected by error detector 23 and the device state of equipment 4(1) which is a manufacturing device, error notifier 24 determines whether or not the error can be corrected by the operation from remote monitoring unit 8. Here, the device state includes, for example, an operation state indicating that touch panel 11 or an operation switch, which is an operation unit that operates equipment 4, is operated, and a safety state indicating whether or not equipment 4 can be safely operated. Further, the device state includes, for example, function setting information indicating whether equipment 4(1) can accept a remote operation by remote monitoring unit 8 and license information for equipment 4 to accept a remote operation by remote monitoring unit 8.

Operation mode change unit 25 has a function of switching the operation mode for the equipment to an automatic operation mode and a remote operation mode allowing a remote operation input from remote monitoring unit 8. That is, in a case where the equipment is in the automatic operation mode and there is a remote operation request from remote monitoring unit 8, the operation mode is changed to the remote operation mode, and an exclusive state is set to restrict the functions of touch panel 11 and the operation button of equipment 4(1). As a result, in a state in which the remote operation from remote monitoring unit 8 is being executed, it is excluded that the worker inadvertently operates on equipment 4(1) at the site.

After the operation mode is changed to the remote operation mode, operation mode change unit 25 displays that the operation mode of equipment 4 (1) is in the remote operation mode by touch panel 11 and equipment notifier 16. In addition, in a case where the operation mode of equipment 4(1) is the remote operation mode and the remote operation is canceled by remote monitoring unit 8, the operation mode of equipment 4(1) is changed to the automatic operation mode. At the same time, the display of the remote operation mode by touch panel 11 and equipment notifier 16 is also erased.

Figure 3:
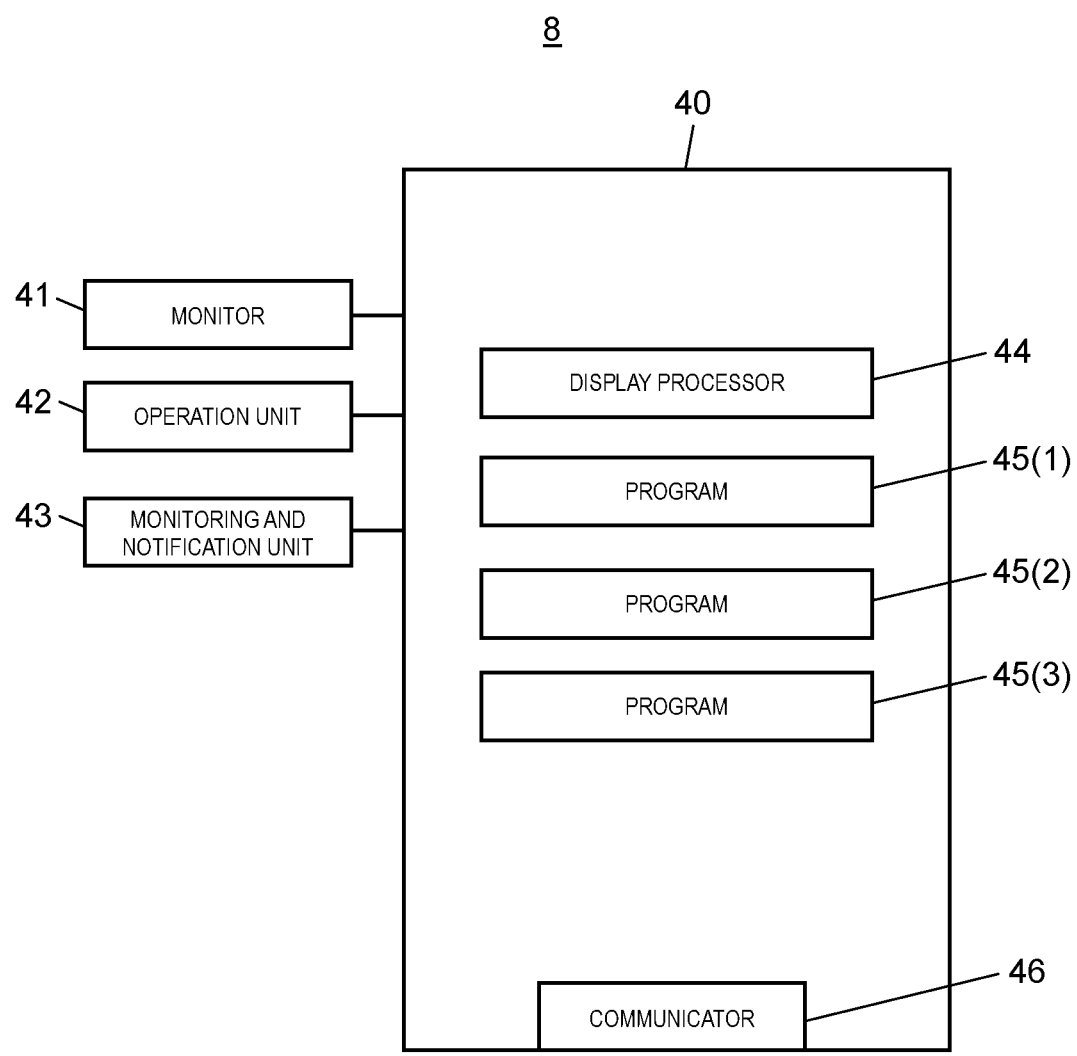
FIG. 3 is a block diagram showing a configuration of a remote monitoring unit constituting the manufacturing device monitoring system of the embodiment.

Next, referring to FIG. 3, a configuration and function of remote monitoring unit 8 will be described. In FIG. 3, processor 40 is a main unit including an arithmetic processor and a storage in a general-purpose PC. To processor 40, monitor 41, operation unit 42, and monitoring and notification unit 43 are connected. Monitor 41 is a display panel such as a liquid crystal panel, and operation unit 42 is an input device such as a keyboard. Monitoring and notification unit 43 is a notifier such as a buzzer or an indicator light and notifies the remote operator who operates remote monitoring unit 8.

Processor 40 is provided with display processor 44, program 45(1), program 45(2), program 45(3), and communicator 46. Communicator 46 is a communication interface which is connected to communication network 7 and communicates with equipment 4 arranged in production area 2 via information manager 6. Display processor 44 is a processing function unit for causing monitor 41 to display a screen.

Program 45(1), program 45(2), and program 45(3) are programs for displaying the operation panel for performing operating inputs for equipment 4(1), equipment 4(2), and equipment 4(3) on monitor 41. By selectively executing program 45(1), program 45(2), and program 45(3), display processor 44 displays the operation panel for performing operating inputs for equipment 4(1), equipment 4(2), and equipment 4(3) on monitor 41 according to the selection.

Figure 4:
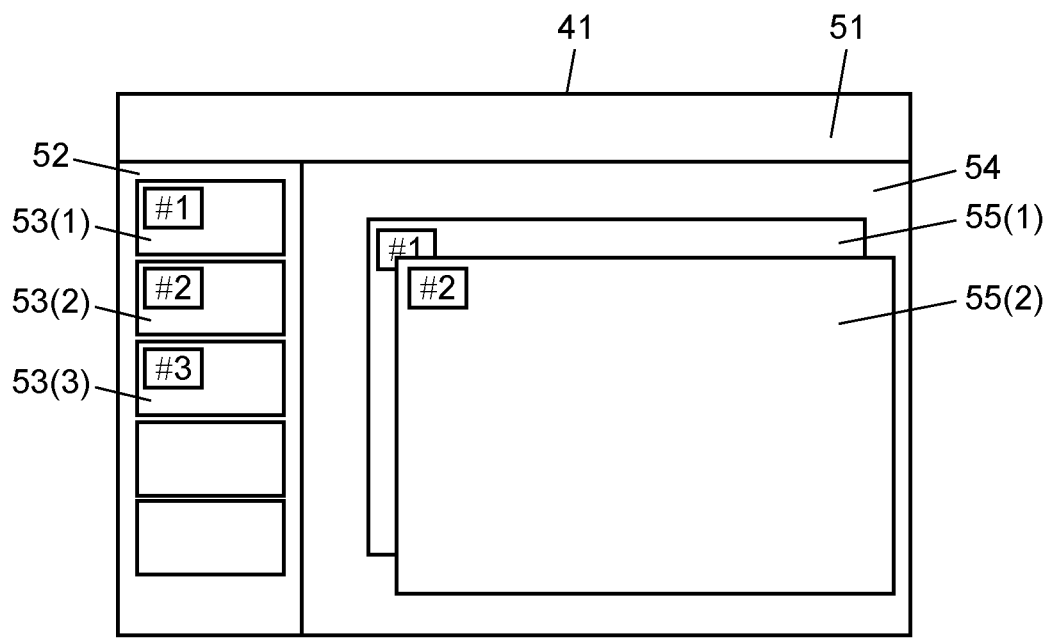
FIG. 4 is a diagram showing an operation panel displayed on a remote monitoring unit constituting the manufacturing device monitoring system according to the embodiment.

FIG. 4 shows a configuration of display screen 50 displayed on monitor 41. Display screen 50 includes operation button display area 51, equipment state display area 52, and operation panel display area 54. In operation button display area 51, various operation buttons for selecting display contents displayed on display screen 50 are displayed. In equipment state display area 52, the states of equipment 4(1), equipment 4(2), and equipment 4(3) that are monitored by remote monitoring unit 8 are displayed in equipment state display fields 53(1), 53(2), and 53(3), respectively.

In each of equipment state display fields 53, the error state of equipment 4 is displayed. In addition to the error to be remotely operated by remote monitoring unit 8, an error not to be remotely operated is also displayed in this error state. In this error display, when an error to be remotely operated occurs, monitoring and notification unit 43 shown in FIG. 3 operates and equipment state display field 53 corresponding to equipment 4 blinks. As a result, the remote operator operating remote monitoring unit 8 is notified of the occurrence of an error to be remotely operated.

In operation panel display area 54, operation panel window 55 for displaying the plurality of pieces of equipment 4 arranged in production area 2 as remote operation targets is displayed. Operation panel window 55 has a screen configuration imitating the operation screen displayed on touch panel 11 of equipment 4. By double clicking on equipment state display field 53 corresponding to equipment 4 to be remotely operated in equipment state display area 52, operation panel window 55 for equipment 4 is opened and displayed in operation panel display area 54. FIG. 4 shows an example in which operation panel windows 55(1) and 55(2) corresponding to equipment 4(1) and equipment 4(2) are opened. By operating operation panel windows 55, various operations for equipment 4 can be executed.

An example of the operations that can be executed by operation panel window 55 is switching processing for starting and ending a remote operation. For example, when operation panel window 55 is opened, a remote operation request is issued to corresponding equipment 4. In addition, by closing operation panel window 55, a remote operation mode for equipment 4 is canceled. The display mode of operation panel window 55 in remote monitoring unit 8 may be any mode, and when the occurrence of an error to be remotely operated is notified from equipment 4 to remote monitoring unit 8, the display mode may be set so that operation panel window 55 corresponding to equipment 4 is automatically displayed in operation panel display area 54.

Figure 5:
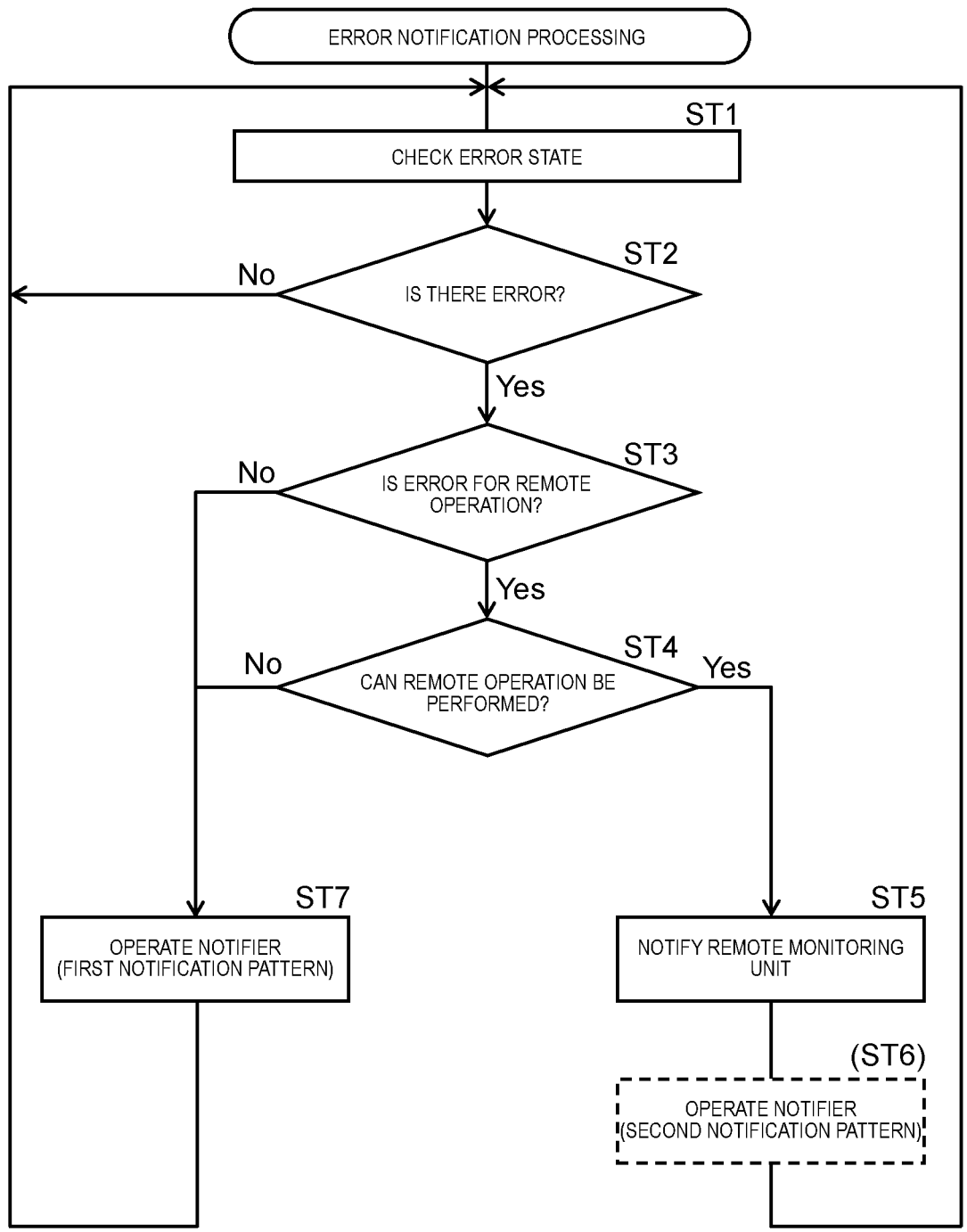
FIG. 5 is a flowchart showing error notification processing in the manufacturing device monitoring system of the embodiment.

Next, with reference to FIG. 5, error notification processing in manufacturing device monitoring system 1 will be described. Here, the processing executed by error notifier 24 in each piece of equipment 4 constituting production line 3 is shown. First, in each piece of equipment 4, the error state at the time of operation in the automatic operation mode is checked (ST1). That is, error notifier 24 checks the stored contents of "error state" 34 of storage 30. Next, it is determined whether or not the checked error state has an error (ST2). That is, it is determined whether or not an error code indicating an error detected by error detector 23 is written in "error state" 34. If the error code is written in "error state" 34 and there is an error, the process proceeds to the next step. If there is no error, the process returns to (ST1) and the monitoring is continued.

(ST2), if there is an error, it is determined whether or not the error is an error for a remote operation (ST3). This determination is made by collating the error code of the error with the "error information for remote operation" 35 by error notifier 24. If it is determined that the error is an error for a remote operation, then it is determined whether or not the device state of equipment 4 can be remotely operated (ST4). This determination is made by referring to "operation state" 31, "safety state" 32, and "remote operation function setting information" 33 stored in storage 30 by remote operation determination unit 22.

Here, in a case where it is determined that a remote operation can be performed, the fact is notified to remote monitoring unit 8 (ST5). At this time, in equipment 4, notification by equipment notifier 16 may not be performed. However, in a case where it is necessary to notify a worker in the vicinity that an error that can be remotely operated is occurring, equipment notifier 16 is operated by the second notification pattern of a modest form with low attention (ST6).

On the other hand, in a case where it is determined that the error is not an error to be remotely operated in (ST3), or in a case where the remote state is determined that the equipment cannot be remotely operated in (ST4), equipment notifier 16 is operated by the first notification pattern (ST7). As a result, workers located in production area 2 are notified that an error occurred that cannot be corrected by a remote operation to equipment 4. After (ST6) and (ST7), the process returns to (ST1) and the same monitoring is continued. As described above, manufacturing device monitoring system 1 shown in the present embodiment is a manufacturing device monitoring system in a factory having a plurality of manufacturing devices, equipment 4. The manufacturing device monitoring system includes the plurality of pieces of equipment 4 and at least one remote monitoring unit 8 which is connected to a plurality of pieces of equipment 4 via a communication network and which is capable of remotely operating the plurality of pieces of equipment 4. Each of the plurality of pieces of equipment 4 includes work unit 15 that performs predetermined work, equipment notifier 16, and error detector 23 that detects an error occurring in work unit 15. Further, each of the plurality of pieces of equipment 4 includes error notifier 24 that determines whether or not the error detected by error detector 23 can be corrected by the operation from remote monitoring unit 8, operates at least equipment notifier 16 with the first notification pattern in a case where the error cannot be corrected, and notifies the occurrence of an error to at least remote monitoring unit 8 in a case where the error can be corrected.

As a result, among the errors occurring in the plurality of pieces of equipment 4, for the error that can be corrected by a remote operation by remote monitoring unit 8, it is possible to entrust the remote operator who operates remote monitoring unit 8 with a response action. Therefore, it is possible to promote labor saving by reducing the workload of the worker who performs monitoring work in the factory having a plurality of pieces of equipment 4.

According to the present disclosure, workload of a worker who performs monitoring work in a factory having a plurality of manufacturing devices can be reduced, and labor saving can be promoted.

The manufacturing device monitoring system and the manufacturing device of the present disclosure have an effect of reducing the workload of a worker performing monitoring work in a factory having a plurality of manufacturing devices and promoting labor saving. Therefore, it is useful in the technical field of monitoring the operation of manufacturing devices in a factory having a plurality of manufacturing devices.

What is claimed is:
1. A manufacturing device monitoring system comprising:
a plurality of manufacturing devices; and
a remote monitoring device that is connected to the plurality of manufacturing devices via a communication network and is capable of remotely operating the plurality of manufacturing devices,
wherein each of the plurality of manufacturing devices includes
a work unit,
an equipment notifier,
an error detector that detects an error occurring in the work unit, and
an error notifier that determines whether or not the error detected by the error detector can be corrected by an operation from the remote monitoring device, notifies the remote monitoring device of the occurrence of the error in a case where the error can be corrected, and operates the equipment notifier to notify a first notification pattern in a case where the error cannot be corrected.

2. The manufacturing device monitoring system of claim 1,
wherein the error notifier operates the equipment notifier to notify a second notification pattern in a case where an error detected by the error detector can be corrected by an operation from the remote monitoring device.

3. The manufacturing device monitoring system of claim 1,
wherein the manufacturing device includes error information that defines an error that can be corrected by an operation from the remote monitoring device, and
the error notifier determines whether or not the error can be corrected by an operation from the remote monitoring device by collating the error detected by the error detector with the error information.

4. The manufacturing device monitoring system of claim 1,
wherein the error notifier determines whether an error can be corrected by an operation from the remote monitoring device based on an error detected by the error detector and a device state of the manufacturing device.

5. The manufacturing device monitoring system of claim 4,
wherein the device state contains an operation state indicating that an operation unit that operates the manufacturing device is operated.

6. The manufacturing device monitoring system of claim 4, wherein the device state contains a safety state indicating whether the manufacturing device can be safely operated.

7. The manufacturing device monitoring system of claim 4, wherein the device state contains function setting information indicating whether the manufacturing device can accept a remote operation by the remote monitoring device.

8. The manufacturing device monitoring system of claim 4, wherein the device state contains license information for allowing the manufacturing device to accept a remote operation by the remote monitoring device.

9. A manufacturing device that is connected to a remote monitoring device via a communication network and is capable of performing a remote operation by the remote monitoring device, the manufacturing device comprising:
a work unit;
an equipment notifier;
an error detector that detects an error occurring in the work unit; and
an error notifier that determines whether or not an error detected by the error detector can be corrected by an operation from the remote monitoring device, notifies the remote monitoring device of the occurrence of the error in a case where the error can be corrected, and operates the equipment notifier to notify a first notification pattern in a case where the error cannot be corrected.

10. The manufacturing device of claim 9, wherein the error notifier operates the equipment notifier to notify a second notification pattern in a case where an error detected by the error detector can be corrected by an operation from the remote monitoring device.

11. The manufacturing device of claim 9, wherein the manufacturing device includes error information that defines an error that can be corrected by an operation from the remote monitoring device, and the error notifier determines whether or not the error can be corrected by an operation from the remote monitoring device by collating the error detected by the error detector with the error information.

12. The manufacturing device of claim 9, wherein the error notifier determines whether or not an error can be corrected by an operation from the remote monitoring device based on an error detected by the error detector and a device state of the manufacturing device.

13. The manufacturing device of claim 12, wherein the device state contains an operation state indicating that an operation unit that operates the manufacturing device is operated.

14. The manufacturing device of claim 12, wherein the device state contains a safety state indicating whether the manufacturing device can be safely operated.

15. The manufacturing device of claim 12, wherein the device state contains function setting information indicating whether the manufacturing device can accept a remote operation by the remote monitoring device.

16. The manufacturing device of claim 12, wherein the device state contains license information for allowing the manufacturing device to accept a remote operation by the remote monitoring device.

* * * * *